United States Patent

[11] 3,552,719

| [72] | Inventor | Donald J. Murauskas<br>Cleveland, Ohio |
|---|---|---|
| [21] | Appl. No. | 832,515 |
| [22] | Filed | Feb. 18, 1969<br>Division of Ser. No. 639,349, May. 18, 1969,<br>Patent No. 3,473,551 |
| [45] | Patented | Jan. 5, 1971 |
| [73] | Assignee | Snap-Tite, Inc.<br>Union City, Pa.<br>by mesne assignment |

[54] ROTARY VALVE
4 Claims, 5 Drawing Figs.

| [52] | U.S. Cl. | 251/297 |
|---|---|---|
| [51] | Int. Cl. | F16k 35/04 |
| [50] | Field of Search | 251/297, 312, 88 |

[56] References Cited
UNITED STATES PATENTS

| 1,611,940 | 12/1926 | Ohmer | 251/297X |
|---|---|---|---|
| 2,416,814 | 3/1947 | Borse et al. | 251/297X |
| 2,488,283 | 11/1949 | Franck | 251/297X |
| 2,491,239 | 12/1949 | Wildern | 251/297 |
| 2,493,966 | 1/1950 | Hartley | 251/312 |
| 2,954,961 | 10/1960 | Stogner et al. | 251/312 |

*Primary Examiner*—M. Cary Nelson
*Assistant Examiner*—Robert J. Miller
*Attorney*—McNenny, Farrington, Pearne & Gordon ABSTRACT: A rotary selector control valve employing a ported rotor assembly rotatable in a ported housing wherein the rotor assembly is provided with drive and position detent arrangements which can be varied for different design configurations. The rotor drive includes a radial pin positioned in any of a series of open slots formed in the rotor. The detent arrangement has recesses in the housing around the rotor and leaf spring detent elements within the recesses allow different configurations.

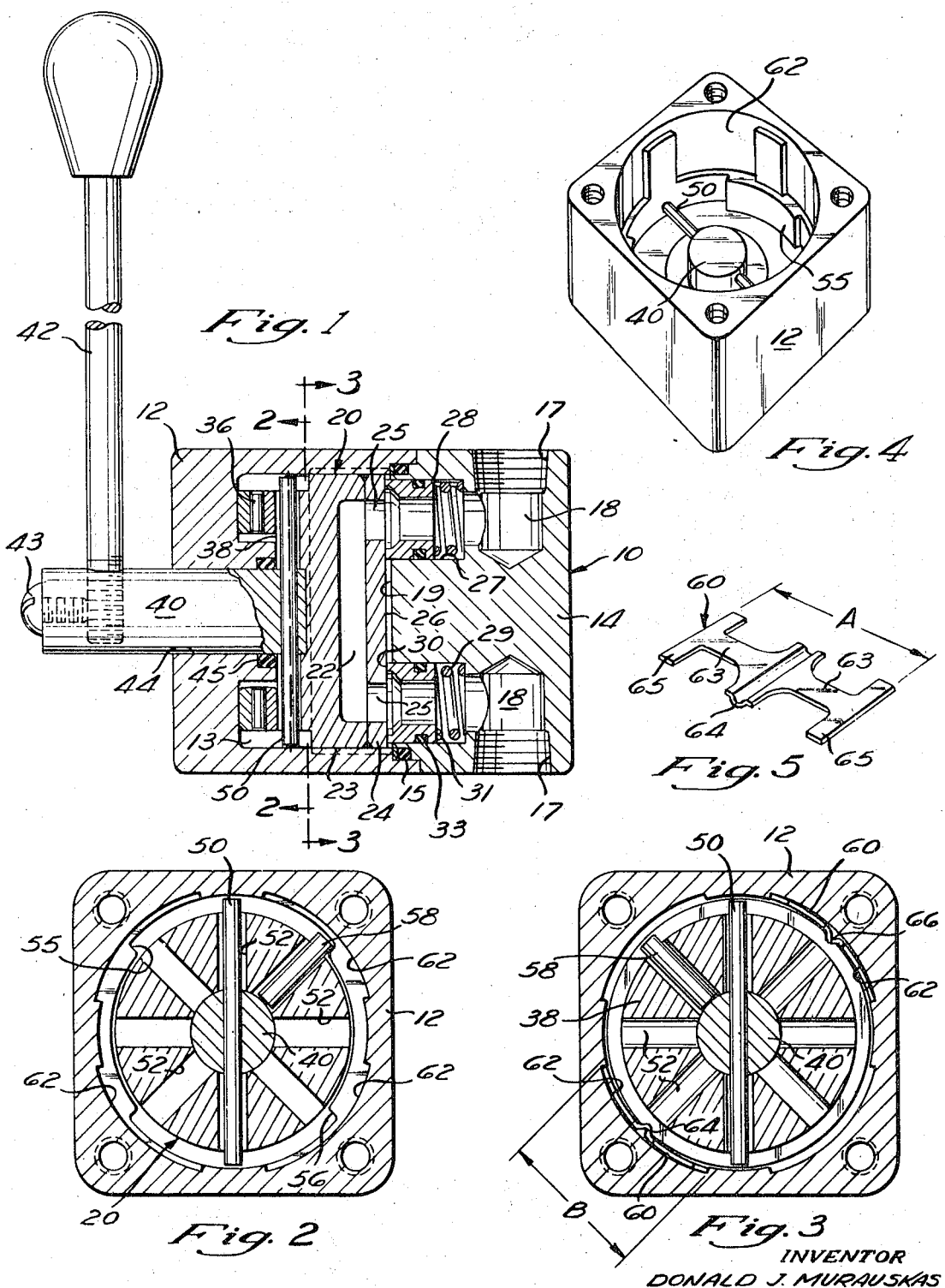

3,552,719

ROTARY VALVE

This is a Division of Ser. No. 639,349 filed May 18, 1969 now U.S. Pat. No. 3,473,551.

BACKGROUNd oF The INVENTION

This invention relates generally to rotary fluid control valves and more particularly to a rotor drive and position holding detent arrangement for such rotary valves.

Many hydraulic systems require one or more selector valves to control the direction of fluid flow to the components of the system. Because of varying design requirements of such systems, no single valve configuration is suitable for all systems, and it is necessary for the valve manufacturers to provide a variety of different valve configurations. Therefore it has been necessary for the valve manufacturer to stock a wide and expensive variety of valves to supply the necessary customer requirements. Thus, much effort has been directed toward simplifying the valve arrangement to minimize the number of different parts by the modular concept to allow a minimum number of basic parts to be utilized in various different combinations to provide many different valves.

SUMMARY OF THE INVENTION

The present invention improves the modular concept of valve construction by providing a rotor assembly with simple rotor drive and position-holding detent arrangements which permit identical standard rotor assemblies to be used with a number of different ported bottom sections to provide a large variety of valve configurations. The rotor drive arrangement includes a shaft having a pin protruding radially therefrom and adapted to be received within any one of a number of annularly oriented slots formed in the driven end of the rotor assembly. By merely engaging the pin with the appropriate slot on the rotor assembly it is possible to vary the orientation of the rotor ports relative to the valve body ports and/or orientation of the handle relative to the rotor to vary the design configuration or valve function. This arrangement also permits the angular extent of rotation of the rotor to either be increased or decreased by removing, adding or changing the position of stop elements in the slots.

According to the preferred embodiment of the invention, the rotor position holding detent arrangement comprises a leaf spring detent element adapted to be disposed within any of a number of different recesses about the outer periphery of the rotor within the housing to produce a variety of detenting patterns. Thus, a standardized rotor assembly can be used to produce valve designs wherein the rotor assembly is retained in different angular positions merely by inserting the detent element in the appropriate recess within the valve housing.

DESCRIPTION OF THE DRAWINGS

FIG. 1 is a partial longitudinal cross-sectional view of a rotary selector valve embodying the present invention;

FIG. 2 is a cross-sectional view taken along line 2-2 of FIG. 1 showing the rotor assembly stop;

FIG. 3 is a cross-sectional view taken along line 3-3 of FIG. 1 showing the rotor assembly drive;

FIG. 4 is a perspective view of the interior of the housing; and

FIG. 5 is a perspective view of one of the detent spring elements shown in FIG. 3.

DESCRIPTION OF THE PREFERRED EMBODIMENT

Referring to the drawings in greater detail, FIG. 1 illustrates a rotary selector control valve 10 according to the preferred embodiment of the present invention adapted to selectively control the direction of fluid flow to the components of a hydraulic system. The body of the selector valve 10 includes a housing member 12 and a ported body member 14 secured together by suitable fastener means such as bolts (not shown) and sealed at their mating interfaces by an O-ring 15. The ported body member 14 forms the manifold to which the fluid lines (not shown) from the fluid pressure source and the components to be controlled are connected. Each of these fluid lines is connected to one of a plurality of threaded ports 17 at the end of a passage 18 extending from the exterior of the body member 14 to the radial face 19 exposed to the chamber 13 in the housing member 12.

With this arrangement, many of the same basic valve parts can be used for a number of different selector valve configurations. By varying the manifold porting arrangements, the ported body member 14 can be provided with a variety of different manifold passage port configurations and used with the same housing member to produce a wide variety of valves from a few standard elements.

The valving mechanism for controlling flow between the several passages 18 is contained within the chamber 13 in the housing 12 and includes a rotor assembly 20 having one or more passages 22 for connection to the passages 18 in the body member. The passages 22 interconnect different manifold passages 18 with one another as the rotor assumes various angular positions.

The rotor assembly 20 may be made in any suitable way such as by brazing or welding a rotor body 23 to a porting plate 24 having a number of ports 25 arranged to cooperate with the manifold porting configuration in the ported body member 14. The outer radial face 26 of the porting plate 24 forms a rotating interface between the rotor assembly 20 and the body member 14. A seal may be provided between the passages 18 and the rotating interface 26 by a floating pressure-responsive seal member or sleeve 28 disposed within an enlarged counterbore 27 formed in each passage 18 adjacent the interface. To provide better sealing engagement between the porting plate 24 and the seal member 28, the seal member 28 has an end face 30 of reduced width and area making sealing contact with the porting plate face 26.

Low pressure sealing between the rotor assembly 20 and the seal elements 28 is assisted by a helical spring 29 which biases the seal member outwardly into engagement with the radial face 26 of the porting plate 24. As the pressure within the system increases, the force of the pressure acting on the exposed end surface 31 of each member 28 urges the seal member into tighter engagement with the rotor plate 26 to provide a tight seal with a minimum amount of friction regardless of the system pressure. To prevent leakage past the seal member 28 an O-ring seal 33 is provided around the exterior of each seal member.

To further reduce the torque necessary to rotate the rotor assembly 20 when it is subjected to the pressure within the system, a thrust bearing 36 is disposed between the housing member 12 and the other radial face 38 of the rotor assembly opposite the side to which the porting plate 24 is secured.

In the illustrated embodiment the rotor assembly 20 is manually rotated by turning a shaft 40 projecting from the housing 12. The shaft 40 is rotated by means of a handle 42 secured to the shaft by a setscrew 43. The shaft 40 is rotatably journaled within a bore 44 in the housing 12. A seal or packing 45 prevents leakage through the bore 44 between the shaft 40 and the housing 12.

As shown in FIG. 2, the rotor assembly 20 is driven by a pin and recess connection comprising a pin 50 extending radially from both sides of the inner end of the shaft 40 and engaging the walls of one of a plurality of slots 52 formed in the adjacent end face 38 of the rotor body 23 and opening toward said shaft. While the slots 52 are shown as being open, it is also possible to provide recesses in the form of transverse bores in the rotor in the same position as the slots but spaced inwardly from the end face of the rotor. Relative rotation of the rotor assembly 20 within the housing 12 is limited by a pair of annularly spaced stops 55 and 56 formed integrally with the housing 12 and projecting into the chamber 13 engaged by the outer ends of the pin 50.

Referring again to FIG. 2, it will be seen that there are a plurality of the slots 52 in the driven end of the rotor assembly 20.

This allows the rotor assembly to be installed in various radial positions relative to the ports of the ported body portion 14. To further limit the rotational displacement of the rotor assembly 20 relative to the housing member 12, an additional pin such as shown at 58 can be installed in one of the other slots.

Referring to FIG. 3, the valve 10 is provided with one or more leaf springlike detent elements 60 disposed within detent recesses 62 formed in the housing member 12. As best shown in FIG. 5, each detent spring element 60 has at its center portion an elongated transverse detent ridge 64 and the elongated ends 65 are spaced from the ridges 64 by web portions 63 of reduced width. The length A of the detent element 60 between the ends 65 is slightly greater than the chord length B but less than the arc length of the detent recess 62 so that the detent ridge 64 is resiliently bowed radially outwardly away from the rotor assembly 20 but is still spaced radially inwardly from the recess wall. In this position the detent ridge 64 can flex radially in and out of a detent groove 66 on the cylindrical exterior surface of the rotor body 23 to prevent rotational drifting of the rotor assembly 20 once the rotor has been properly positioned by the handle 42. Since the rotor assembly 20 is surrounded by the hydraulic fluid during operation of the system, the thrust bearing assembly 36 and the detents 60 are continually lubricated, thus assuring their smooth operation and long operating life.

While the preferred embodiment has been shown and described in detail, it is recognized that the invention is not limited to the particular form and various modifications and other arrangements can be resorted to without departing from the scope of the invention as defined by the following claims.

I claim:

1. A valve comprising a housing defining a fluid chamber and having a peripheral wall, a valve member mounted for rotation in said chamber, said valve member having a peripheral surface extending adjacent said peripheral wall and spaced radially therefrom, said peripheral wall defining a recess portion in axial alignment with said valve member and spaced radially therefrom a greater distance than other portions of said peripheral wall, a leaf spring member carried in said recess and having a portion thereof resiliently flexible to and from the peripheral surface of said valve member, and cooperable detent means on said peripheral surface and said leaf spring portion to prevent relative rotation between said valve member and said housing.

2. A valve as set forth in claim 1 wherein said detent means comprises a groove on said rotor and a ridge on said detent spring.

3. A valve as set forth in claim 2 wherein said detent spring has a center portion carrying said detent ridge and web portions of lesser cross-sectional area on each side of said detent ridge whereby a greater portion of the flexing of said spring member takes place at said web portions.

4. A valve as set forth in claim 3 wherein said leaf spring member has a length between its ends greater than the chord length of said recess and less than the arc length of said recess.